July 21, 1942.  J. W. DAWSON  2,290,543
WELDING TIMER
Filed Oct. 12, 1938  3 Sheets-Sheet 3
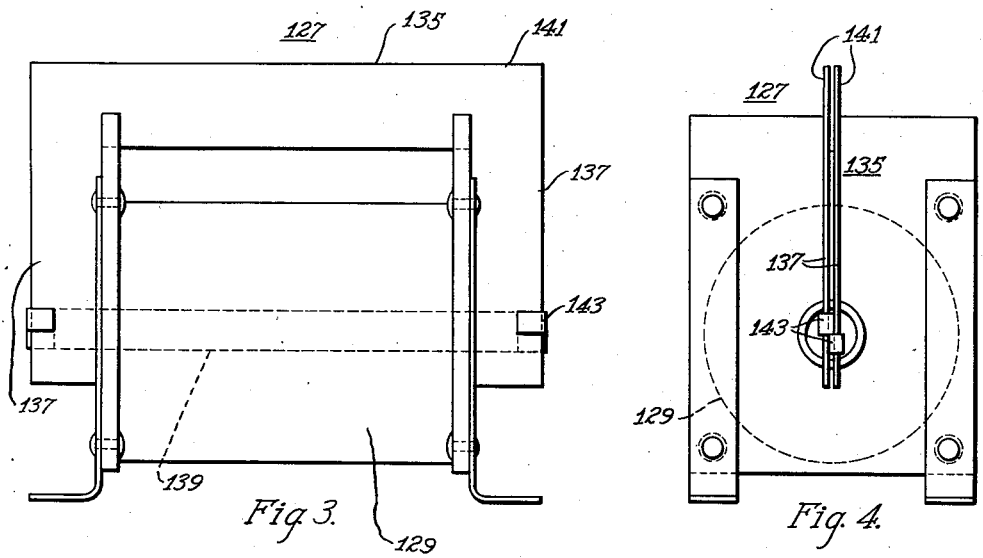
Fig. 3.  Fig. 4.
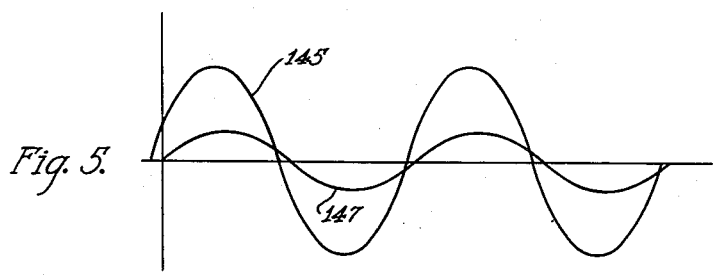
Fig. 5.
Fig. 6.
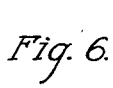
Fig. 7.
WITNESSES:
E. F. Oberlein.
Hymen Diamond.
INVENTOR
John W. Dawson.
BY
F. W. Legle.
ATTORNEY Patented July 21, 1942

2,290,543

UNITED STATES PATENT OFFICE 2,290,543

WELDING TIMER

John W. Dawson, Auburndale, Mass., assignor to Westinghouse Electric & Manufacturing Company, East Pittsburgh, Pa., a corporation of Pennsylvania Application October 12, 1938, Serial No. 234,635

9 Claims. (Cl. 250—27)

My invention relates to control apparatus, and has particular relation to timing systems for resistance welding apparatus.

The resistance welding industry is at the present time expanding rapidly and welding apparatus is now being applied in many fields in which its use was considered fantastic only a short time ago. New applications of resistance welding require considerable experimental work, and for this reason there is at present a wide demand for welders which may be adapted with facility to experimental purposes. This demand arises in particular in aircraft plants in which considerable pioneering work is at the present time in progress. Welding machinery manufacturers and the manufacturers of metals, such as aluminum, magnesium and steel, are also greatly interested in apparatus of this type.

Welders for experimental purposes must necessarily be so constructed that they lend themselves with facility to the innumerable tests which must be carried out to precisely determine the most propitious welding methods for the countless materials involved. For this purpose it must be possible not only to control the welding time and the welding heat in fine steps over a wide range, but to produce spot welds and seam welds without making elaborate changes in the apparatus and the welding circuits involved.

It is accordingly an object of my invention to provide welding apparatus with which it shall be possible to carry out both seam welding and spot welding and the conversion from one mode of welding to the other shall require only simple operations.

Another object of my invention is to provide a combined spot and seam welding system of simple and tractable structure.

A further object of my invention is to provide a combined spot and seam welding system avoiding, where possible, the duplication of parts, while at the same time retaining facilities for the fine adjustment over a wide range of timing and heat control.

A more specific object of my invention is to provide a novel timing arrangement for a spot welder which is particularly adapted to be combined with a seam welder for the purpose of carrying out a wide diversity of experiments in welding.

An ancillary object of my invention is to provide an arrangement for stabilizing the operation of a discharge valve of the arc-like type when supplying a load having a high impedance.

Another ancillary object of my invention is to provide an arrangement for eliminating inaccuracies in the operation of a timing arrangement wherein the time period is measured out by the charge or discharge of a capacitor.

A further ancillary object of my invention is to provide a peaking reactor of simple and inexpensive structure.

An additional ancillary object of my invention is to provide a novel arrangement for biasing an electric discharge valve.

More concisely stated, it is an object of my invention to provide a combined spot and seam welder in which the individual parts are designed to cooperate with each other in such manner that the maximum facility in carrying out experiments in welding is combined with the maximum economy in the construction and operation of the apparatus.

According to my invention, I provide a welding arrangement in which the welding current is transmitted through electric discharge valves. The heat supplied for welding purposes is controlled in the usual manner by the operation of auxiliary valves which render the main valves conductive at predetermined instants in the half-periods of the supply source. The same main valves and heat control valves are used for seam welding and for spot welding. To time the welding, auxiliary timing valves are provided. Separate timers are provided to control the operation of the latter valves for spot welding and for seam welding as the case may be.

To pass from one mode of welding to another, a drum switch is operated. The contacts of the switch are so connected in the system that they provide for the complete disconnection of the timing system not in use and for the complete connection of the timing system in use.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figs. 1 and 2 constitute together a diagrammatic view showing an embodiment of my invention;

Fig. 3 is a side view of the novel transformer used in the practice of my invention;

Fig. 4 is an end view of the transformer;

Fig. 5 is a graph showing the time variation of the current and potential waves impressed on the primary of the transformer;

Fig. 6 is a graph showing the flux through the transformer as a function of time; and Fig. 7 is a graph showing the secondary potential of the transformer.

Figure 1:
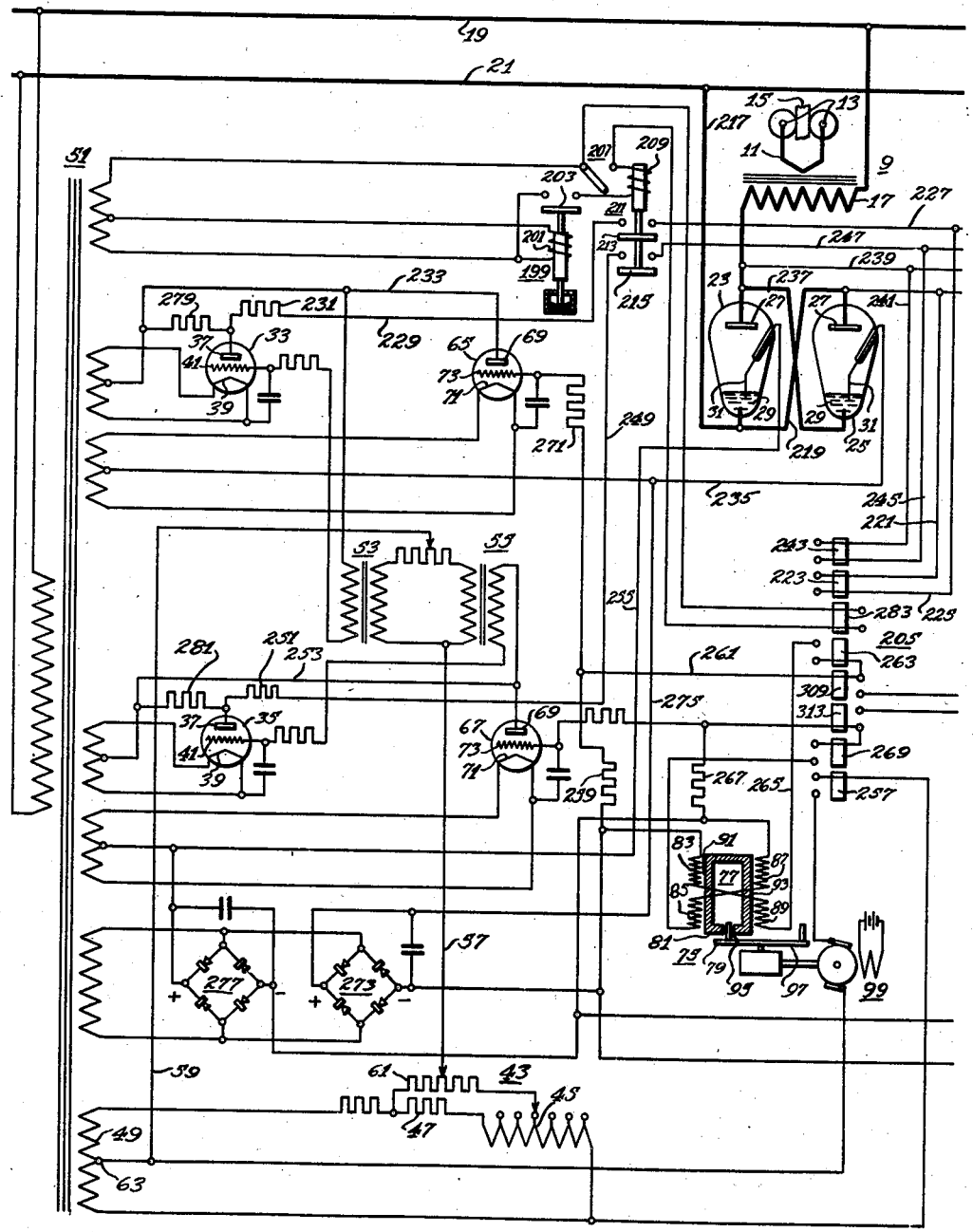
Figure 2:
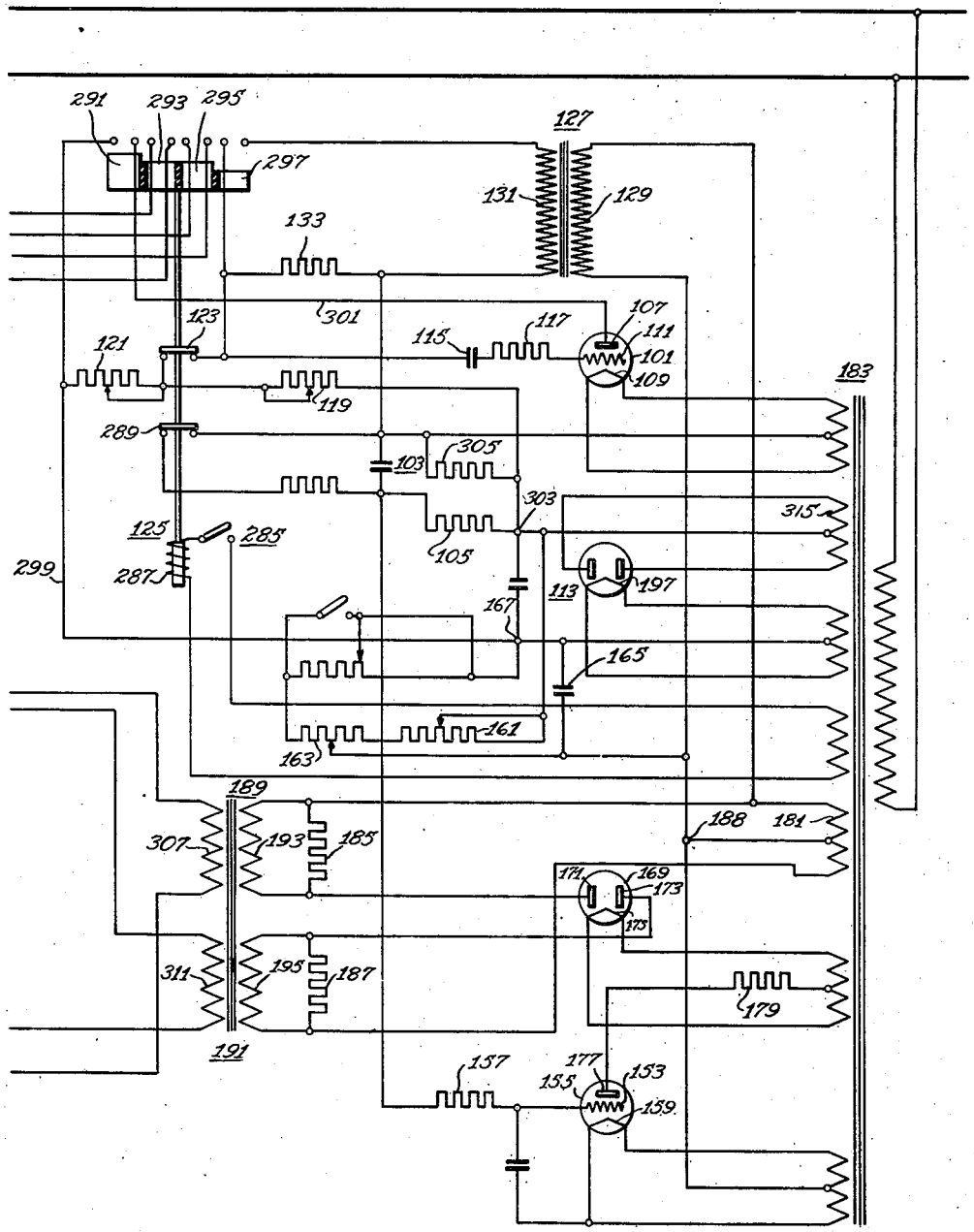

The apparatus shown in the drawings comprises a welding transformer 9 across the secondary 11 of which a pair of welding electrodes 13 is connected. The material 15 to be welded is interposed between the electrodes 13, and when the transformer 9 is energized, welding current is transmitted through the material. The primary 17 of the welding transformer 9 is connected across a pair of supply line conductors 19 and 21, which may be energized from a source of alternating current of any general type, such as the usual commercial 60-cycle supply, through a pair of electric discharge valves 23 and 25 of the immersed-ignition-electrode type. The valves 23 and 25 are connected in anti-parallel and control the transmission of alternating current to the transformer 9. Each of the valves 23 and 25 comprises an anode 27 of nickel, carbon or other suitable material, a mercury-pool cathode 29 and an ignition electrode 31 of a high resistance material, such as boron carbide or silicon carbide.

The heat supplied for welding purposes is controlled through auxiliary valves 33 and 35 of the arc-like type which we may here designate as heat controlled valves. Each of the latter comprises an anode 37, a hot cathode 39 and a control electrode 41 and a gaseous medium. The welding heat is controlled by rendering the heat control valves 33 and 35 conductive at predetermined instants in the half-periods of the source 19, 21, so that current is transmitted through the ignition electrodes 31 and the cathodes 29 of the corresponding main valves 23 and 25, and the main valves are rendered conductive at these instants.

The angle in the half-cycles of the source 19, 21 at which the heat control valves 33 and 35 are rendered conductive is preset by the usual phase-shift network 43. The latter comprises a reactor 45 and a resistor 47 supplied in series from the main conductors 19 and 21 through a center tapped secondary section 49 of a supply transformer 51. Potential derived from the phase shift network 43 is supplied between the control electrodes 41 and the cathodes 39 of the heat control valves 33 and 35 through control transformers 53 and 55, respectively, which are connected in parallel to conductors 57 and 59 extending respectively from a resistor 61 interconnecting the phase-shift impedances 45 and 47 and the intermediate terminal 63 of the secondary section 49.

For timing purposes, another pair of auxiliary valves 65 and 67 of the arc-like type, which we may herein designate as timing valves, is provided. Each of the latter valves comprises an anode 69, a hot cathode 71, a control electrode 73, and a gaseous medium. When the apparatus is set for seam welding, the timing valves are controlled from a magnetic impulsing device 75. The latter comprises a rectangular magnetic core 77 having an air gap 79 in its lower leg 81 and windings 83, 85, 87 and 89 on its vertical legs 91 and 93, respectively. Pins 95 of magnetic material mounted along the periphery of a disc 97, rotated from a synchronous motor 99, are successively moved into and out of the gap 79, and as they move, they induce impulses in the windings 83 to 89. The windings 83 to 89 are connected in the control circuits of the timing valves 65 and 67 and the impulses induced are of such magnitude that the latter are rendered conductive when they occur. The pins 95 may be so pre-arranged in the disc 97 that the timing valves are rendered conductive during predetermined successive half-periods of the source and are non-conductive during the intermediate half-periods.

The spot weld timing system includes a further auxiliary electric discharge valve 101 of the arc-like type, through which a timing capacitor 103 is charged through a timing resistor 105. The auxiliary valve 101 comprises an anode 107, a hot cathode 109, a control electrode 111 and a gaseous medium. Direct-current anode-cathode potential is supplied to the valve from a full-wave rectifier system 113 supplied from the main line conductors 19, 21, and it is initially maintained non-conductive by a biasing capacitor 115 in its control circuit. The capacitor 115 is connected on one side to the control electrode 111 of the valve 101 through a grid resistor 117. On the other side it is connected to a point intermediate a pair of rheostats 119 and 121 through the movable contactor 123 of a starting relay 125 which is closed when the relay is deenergized. The rheostats 119 and 121 are connected directly across the direct-current potential supply 113 and, therefore, the potential of the control electrode derived from the juncture of the rheostats is more positive than the negative terminal of the supply 113. The cathode 109 of the auxiliary valve 101 on the other hand is initially substantially at the potential of the negative terminal of the supply 113 and, therefore, current flows between the control electrode 111 and the cathode 109 and the biasing capacitor 115 is charged to a potential such that it maintains the valve 101 blocked.

The biasing potential supplied by the capacitor 103 is counteracted, when the apparatus is in operation, by impulses provided by a peaking transformer 127. The primary 129 of the transformer is energized from the line conductors 19 and 21 and the secondary 131 transmits the impulses induced therein when the primary carries current through a resistor 133. The resistor 133 is connected at one of its terminals to the control electrode 111 of the auxiliary valve 101 through the biasing capacitor 115, and at the other terminal to the cathode 109 of the auxiliary valve. The impulses produced in the secondary 131 are thus superimposed on the biasing potential provided by the capacitor.

While peaking transformers of the ordinary structure may be used in the practice of my invention, I prefer the novel structure shown in Figs. 3 and 4. The transformer 127 disclosed in this view comprises a soft iron two-legged yoke 135, the legs 137 of which are magnetically connected by a narrow strip 139 of a highly magnetizable steel, fastened near their outer ends. The yoke 135 may consist of a pair of ordinary transformer punchings 141, the center legs of which have been removed. The highly magnetizable strip 139 may be fastened to the punchings 141 by slitting its ends at the center and bending the two portions 143 thus produced each over a punching.

The highly magnetizable material which I prefer to use for the strip 139 in the practice of my invention is an alloy composed of 40 to 60% nickel and 60 to 40% iron, which is described in detail in Patent No. 1,807,021, to Trygve D. Yensen, dated May 26, 1931, and assigned to the Westinghouse Electric & Manufacturing Company. The material is sold by the assignee of the patent under the trade name "Hipernik."

The primary winding 129 is a cylindrical coil mounted coaxially with the highly magnetizable strip 139. It contains substantial ohmic resistance. The secondary 131 is a many-turn cylindrical coil wound directly over the primary. In Figs. 3 and 4 the primary and secondary windings are shown as a unit.

The operation of the transformer is illustrated in Figs. 5 to 7. In all of these views, time is plotted horizontally. In Fig. 5, potential and current are plotted vertically; the sine wave curve 145 of larger amplitude represents the potential impressed on the primary 129 of the transformer 127; the sine wave curve 147 of smaller amplitude represents the current flowing through the primary. In view of the fact that the ohmic resistance of the primary is relatively high, the potential and current are very nearly in phase with each other as shown by the plots.

In Fig. 6 the flux through the core of the transformer is plotted vertically. Since the Hipernik strip saturates quickly, the flux through the core increases only in the region of zero current and is substantially constant when the current through the primary is of substantial value. The trapezoidal-shaped curve 149 in Fig. 6 represents this situation.

In Fig. 7, the secondary potential is plotted vertically. Since this potential depends on the rate of change of flux, it is impulsive in character and occurs only in the regions where the flux varies. The peaked curves 151 of Fig. 7 represent the secondary potential.

When the circuit through the secondary 131 of the peaking transformer 127 is closed, peaked impulses are impressed across the resistor 133 in series therewith and counteract the biasing potential in the control circuit of the auxiliary valve 101. The auxiliary valve 101 transmits current to charge the timing capacitor 103 through the timing resistor 105.

The timing resistor 105 is connected at one terminal to the control electrode 153 of a second auxiliary valve 155 of the arc-like type through a grid resistor 157, and at the other terminal to the cathode 159 of the latter valve through a pair of voltage dividers 161 and 163. Before the timing capacitor 103 begins to charge the current through the timing resistor 105 is zero and the voltage dividers 161 and 163 which are connected directly across the direct-current potential supply 113 function to impress a negative potential in the control circuit of the second auxiliary valve 155 to maintain it non-conductive. The biasing potential supplied through the voltage dividers 161 and 163 is counteracted by the potential drop across the timing resistor 105 which exists when the capacitor is being charged. By properly setting the voltage dividers 161 and 163, the counteracting effect may be made to persist for any desired interval of time and this time interval is used to measure out the time during which the current flows for spot welding.

Where a relatively long timing interval is desired, difficulty is involved in precisely setting the biasing voltage dividers 161 and 163 because the time rate of variation of the potential drop across the timing resistor 105 becomes small when the timing capacitor has been charged for some time. Slight variations in the source potential, for example, in such a case tend to produce substantial variations in the timing because the charging characteristic for the capacitor 103 is relatively horizontal at the desired cut-off point. To remedy this disadvantage, another capacitor 165 is connected between the cathode 159 of the second auxiliary valve 155 and the positive terminal 167 of the direct-current supply 113. The capacitor causes ripples from the rectifier 113 to be superimposed on the potential impressed through the timing resistor 105. The ripples increase the steepness of the wave front of the timing potential and, therefore, cause the arrangement to operate with considerably more precision. The capacitor 165, in addition, permits the remote location of the voltage dividers 161 and 163 since it has a filtering action which nullifies whatever disturbances are picked up in the leads extending to the remote dividers. Since the voltage dividers 161 and 163 are adjusted by hand and, in the experimental work for which the apparatus is particularly designed, frequent adjustments may be necessary, the remote location of the dividers is of substantial advantage.

The second auxiliary valve 155 is supplied with positive half-waves of potential from the main line conductors 19 and 21 through a full-wave rectifier 169. In the preferred practice of my invention, a single tube having a pair of anodes 171 and 173 and a cathode 175 is used. The cathode 175 of the rectifier 169 is connected to the anode 177 of the second auxiliary valve through a current limiting resistor 179. The rectifier 169 is energized from a center tapped secondary section 181 of a transformer 183 supplied from the line of conductors 19 and 21. One anode 171 of the rectifier 169 is connected to one terminal of the secondary section 181 through a resistor 185, and the other anode 173 is correspondingly connected to the other terminal of the secondary section through another resistor 187. The intermediate tap 188 of the section is connected to the cathode 159 of the second auxiliary valve 155. When the latter valve is rendered conductive by the potential drop across the timing resistor 105, half-wave impulses of current flow alternately through the resistors 185 and 187 in series with the branches of the rectifier. The potential drop across the resistors 185 and 187 is used for the purpose of timing the flow of current for spot welding. This potential is impressed in the control circuits of the timing valves 65 and 67 through control transformers 189 and 191, the primaries 193 and 195 of which are connected in parallel with the resistors 185 and 187.

Initially, the system is energized by the operation of a suitable main switch or circuit breaker (not shown). The closure of the main circuit breaker causes heating energy to be supplied to the cathodes 39, 71, 109, 159, 175 and 197 of the heat control, the timing and the other auxiliary valves 37, 39, 65, 67, 101 and 155 and the rectifiers 113 and 169. The application of anode-cathode potential to the valves and rectifiers, however, is delayed by a time delay relay 199. The exciting coil 201 of the relay is supplied with current on the closure of the main switch, but the movable contactor 203 of the relay closes only after the hot cathodes of the auxiliary valves and rectifiers have become sufficiently heated for the purpose of emission. The apparatus is set to weld in the manner desired by a drum switch 205. In one position it may be set for a seam welding operation, and in the other position for a spot welding operation.

For seam welding, the drum switch 205 is moved towards the left, and when it is set in the latter position, the seam welding circuit controller 207 is closed. The latter is shown as a knife switch but it may be any general manual controller such as a foot switch or a push button. The closure of the manual switch 207 causes current to flow through the movable contactor 203 of the time relay 197 and the exciting coil 209 of a starting relay 211. The movable contactors 213 and 215 of the starting relay 211 are now closed and circuits are completed through the heat control and timing valves 33 and 65 and 35 and 67, respectively.

The circuit through the upper set of auxiliary valves 33 and 65 extends from the lower line conductor 21 through a conductor 217, a conductor 219, a conductor 221, the second drum switch movable contactor 223 from the top, a conductor 225, a conductor 227, the upper movable contactor 213 of the starting relay 211, a conductor 229, a current limiting resistor 231, the anode 37 and the cathode 39 of the heat control valve 33, a conductor 233, the anode 69 and the cathode 71 of the timing valve 65, a conductor 235, the ignition electrode 31 and the cathode 39 of the right-hand main valve 25, a conductor 237, the primary 17 of the welding transformer 9, to the upper line conductor 19. The circuit for the lower set of auxiliary valves 35 and 67 extends from the upper line conductor 19, through the primary 17 of the welding transformer 9, a conductor 239, a conductor 241, the upper movable contactor 243 of the drum switch 205, a conductor 245, a conductor 247, the lower movable contactor 215 of the starting relay 211, a conductor 249, a current limiting resistor 251, the anode 37 and the cathode 39 of the heat control valve 35, a conductor 253, the anode 69 and the cathode 71 of the timing valve 67, a conductor 255, the ignition electrode 31 and the cathode 29 of the left-hand main valve 23, the conductor 217, to the lower line conductor 21. It is to be noted that the heat control and timing valves are so connected that each set of valves 33 and 65 and 35 and 67 receives positive anode cathode potential simultaneously with the main valves 25 and 23, respectively, through the ignition electrode 31 of the which they transmit current.

When the drum switch 205 is in the seam welding position, its lower movable contactor 257 closes a circuit through the synchronous motor 99, whereby the seam welding timing disc 97 is rotated. The pins 95, therefore, pass through the air gap 77 in the core 79 of the impulse generator 75 and impulses are induced in the coils 83, 85, 87 and 89. The impulses in the upper left-hand coil 83 and the lower right-hand coil 89 are impressed in a circuit which extends from the upper terminal of the left-hand coil 83 through a resistor 259, a conductor 261, the 4th movable contactor 263 of the drum switch 205 from the top, a conductor 265, to the lower terminal of the right-hand coil 89. The impulses induced in the upper right-hand coil 87 and the lower left-hand coil 85 are correspondingly impressed across a resistor 267 in series with the coils and the 7th movable contactor 269 of the drum switch from the top.

The first-mentioned resistor 259 is connected at one of its terminals to the control electrode 73 of the upper timing valve 65 through a grid resistor 271, and at its other terminal to the cathode 71 of the same timing valve through a biasing source 273 and a conductor 275. The other resistor 267 is correspondingly connected between the control electrode 73 and the cathode 71 of the lower timing valve 67 through another biasing source 277.

In the absence of the impulses from the generator 75, the biasing sources 273 and 277 maintain the timing valves 65 and 67 non-conductive. The polarity and the magnitude of the impulses are such that the biasing potentials are counteracted when the impulses are impressed and the timing valves are rendered conductive. The heat control valves 33 and 35 are rendered conductive by the potential supplied through the phase shift network 43, and transmit the current conducted by the timing valves 65 and 67, respectively, through the corresponding ignition electrodes 31.

The pins 95 are so arranged in the disc 97 that the impulses produced by the generator 75 occur early in the half periods of the supply 19, 21. Accordingly, the valves 65 and 67 may be rendered conductive early in the half periods. On the other hand the heat control valves 33 and 35 may be rendered conductive at a substantial angle in the corresponding half cycles of the source. To provide for the transmission of current through the timing valves 65 and 67 in the intervals before the corresponding heat-control valves 33 and 35 are rendered conductive, the anode-cathode paths of the latter valves are bridged by resistors 279 and 281, respectively. The current is initially transmitted through the timing valves 65 and 67 and the resistors 279 and 281, respectively, and is of such magnitude that the main valves 25 and 23 are not rendered conductive. At instants predetermined by the setting of the phase-shift network 43, the heat control valves 33 and 35 are rendered conductive, and at these instants the latter valves short circuit the bridging resistors 279 and 281, respectively, and current from the timing valves 65 and 67 is transmitted in each case through the associated heat control valves 33 and 35 and the associated ignition electrodes 31 and cathodes 29. The main valves 23 and 25 are now rendered conductive and current is supplied through the material 15 to be welded.

The magnetic pins 95 are inserted in the seam welding timing disc 79 at points to correspond to the desired current flow. The speed of the disc 79 is such that a pin passes through the gap 77 during a half-period of the supply source 19, 21. Accordingly, for a particular arrangement of pins, the timing valves and the heat control valves are rendered conductive for a predetermined number of half-periods of the source and remain non-conductive during the intervening half-period, and the flow of welding current varies in corresponding manner.

When a spot welding operation is desired, the drum switch 205 is disengaged from the seam welding position and moved to the spot welding position. By the movement of the switch the synchronous motor circuit is opened and the motor stops. The circuits through the impulse coils 83, 85, 87 and 89, and the resistors 259 and 267 are also opened and there is no possibility of disturbing influences being introduced through the coils into the control circuits of the timing valves 65 and 67 by accidental rotation of the disc. The starting relay 211, in lieu of being energized through the seam welding circuit controller 207, is now energized through the third movable contactor 283 from the top of the drum switch 205 which, with the switch in the spot welding position, bridges the contacts of the seam welding circuit controller 207.

With the drum switch 205 in the spot welding position, a weld is initiated by the closing of the spot welding circuit controller 285, which may also be a foot switch or a push button. Current is now supplied to the exciting coil 287 of a spot welding starting relay 125 to energize the relay. The relay, when energized, simultaneously opens the contactor 123 through which the biasing capacitor 115 is charged and a contactor 289 which short circuits the timing capacitor 103 and progressively closes a number of other contactors 291, 293, 295 and 297.

With the contactor 123 open, the biasing potential of the capacitor 115 is impressed between the control electrode 111 and the cathode 109 of the auxiliary valve 101, through the resistor 133 in the secondary circuit of the impulsing transformer. The contactor 291 of the spot welding starting relay 125, which is the first to close, completes the anode-cathode circuit of the auxiliary valve 101. This circuit extends from the positive terminal 167 of the direct-current supply 113 through a conductor 299, the contactor 291 of the relay 125, a conductor 301, the anode 107 and the cathode 109 of the auxiliary valve 101, the timing capacitor 103, the timing resistor 105, to the negative terminal 303 of the direct-current supply. However, in spite of the fact that anode-cathode potential is now supplied to the auxiliary valve 101, the latter is maintained non-conductive by the biasing potential supplied by the capacitor 115.

The contacts 293 and 295 of the starting relay 125 which are next closed, bridge the conductors 219 and 227 and 239 and 247, respectively, which are bridged by the second contactor 223 from the top and the upper contactor 243 of the drum switch 205 when the latter was in the seam welding position. These contactors thus close the circuits through the heat control and timing valves 33 and 65 and 35 and 67, respectively, and the corresponding ignition electrodes 31 and cathodes 29 of the main valves 25 and 23, respectively, just as they were originally closed by the corresponding movable contactors of the drum switch.

The last movable contactor 297 of the starting relay 125 to close completes the circuit through the secondary 131 of the impulsing transformer 127 and the resistor 133 in series therewith. Impulses are now supplied in the control circuit of the auxiliary valve 101 through the resistor 133 and the biasing potential supplied by the capacitor 115 is counteracted. The impulses occur early in the half-periods of the supply source and, therefore, the auxiliary valve 101 is rendered conductive early in that half-period of the supply source which follows the closing of the secondary circuit of the impulsing transformer 127. Current now flows through the anode 167 and the cathode 109 of the auxiliary valve 101 and the timing capacitor 103 in series with the auxiliary valve is charged through the timing resistor 107.

The impedance of the timing capacitor 103, and particularly the timing resistor 105, is relatively large so that the impedance in series with the anode 107 and the cathode 109 of the auxiliary valve 101 is of substantial magnitude. For this reason, the current flow through the auxiliary valve is relatively small. I have found that when the current transmitted by a valve of the arc-like type is low, the stability of the valve is somewhat impaired. A valve carrying small current tends to become non-conductive when negative potential is impressed between its control electrode and its cathode. Since the biasing capacitor potential and the inverse impulses from the peaking transformer 127 together are of substantial negative magnitude, the valve 101 would have a tendency to operate with some instability. To suppress this difficulty, a resistor 305 of substantially smaller impedance than that of the timing capacitor 103 and the timing resistor 105 is connected in parallel with the latter impedances. I have found that a resistor having a resistance of ⅓ of that of the timing resistor 105 produces satisfactory results.

The current transmitted through the timing resistor 105 produces a potential drop across the resistor which counteracts the biasing potential impressed on the second auxiliary valve 155, and the latter valve is rendered conductive. Current is now transmitted through the branches 171, 175 and 173, 175 of the rectifier 169 and the resistors 185 and 187 associated therewith. The potential drop across the resistors is impressed on the control transformers 189 and 191, the primaries 193 and 195 of which are connected in parallel with the resistors 185 and 187. The secondary 307 of the former control transformer 189 is connected, through the 5th movable contactor 309 from the top of the drum switch 205, across the resistor 259 in the control circuit of the upper timing valve 65. The secondary 311 of the other control transformer 191 is correspondingly connected across the other resistor 267 through the 6th movable contactor 313 of the drum switch 205 from the top. The potentials from the control transformers 189 and 191 thus replace the potentials from the impulse generator 75 in the control circuits of the timing valves 65 and 67, and the latter are rendered conductive in response to the potentials supplied through the control transformers 189 and 191 in the same manner as they are rendered conductive in the seam welding position in response to the potentials by the impulse generator 75. The timing valves 65 and 67 now again transmit current through the bridging resistors 279 and 281, respectively, and the associated ignition electrodes 31 and cathodes 29 of the main valves 25 and 27, respectively, in the same manner as for seam welding, and when the heat control valves 33 and 35, respectively, are rendered conductive, ignition current is transmitted in the same manner as for seam welding. The main valves 25 and 27 are then rendered conductive to transmit current through the material to be welded.

The second auxiliary valve 155 and the main valves 33, 35, 65 and 67 continue to conduct current in this manner until the timing capacitor 103 is charged to a potential such that the biasing potential impressed on the second auxiliary valve is no longer sufficient to counteract the bias. Thereafter the second auxiliary valve 155 is rendered non-conductive and the flow of welding current ceases. In this manner, a single spot weld is produced. To produce a second weld the manual switch 285 is opened and reclosed, thus again operating the spot welding starting relay 125.

In a system constructed in accordance with my invention which was found to operate satisfactorily, the elements were of the following dimensions and structures:

| | |
|---|---|
| Main valves 23 and 25 | Ignitron tubes selected in accordance with the desired current-carrying capacity. A Westinghouse WL-651 tube capable of carrying 2800 amperes is satisfactory. |
| Heat control valves 33 and 35. | Westinghouse KU-676. |
| Timing valves 65 and 67. | Westinghouse KU-676. |
| First auxiliary spot welder valve 101. | Westinghouse KU-627. |
| Second auxiliary spot welder valve 155. | Westinghouse KU-627. |
| Rectifier 113 providing direct current potential. | Westinghouse RO-587. |
| Rectifier 155 in series with second auxiliary valve. | Westinghouse RO-587. |
| Drum switch 205 | Westinghouse Type W switch. |
| Starting relay 211 | Westinghouse HC relay. |
| Resistors 279 and 281 bridging heat control valves. | 10,000 ohms. |
| Current limiting resistors 231 and 251 in series with heat control and timing valves. | 1.1 ohms. |
| Potential across secondary 315 connected to rectifier 113 supplying direct-current potential. | 460 volts. |
| Rheostat 121 connected to positive terminal of direct-current supply. | 200,000 ohms. |
| Rheostat 119 connected to negative terminal of direct-current supply. | 100,000 ohms. |
| Biasing capacitor 115 for auxiliary valve. | .01 microfarad. |
| Grid resistor 117 in series with biasing capacitor 115. | ½ megohm. |
| Resistor 133 in secondary circuit of impulsing transformer 127. | 200,000 ohms. |
| Timing capacitor 103 | 2 microfarads. |
| Timing resistor 105 | 150,000 ohms. |
| Stabilizing resistor 305 | 50,000 ohms. |
| Ripple capacitor 165 | 2 microfarads. |
| Voltage dividers 161 and 163 across direct-current potential supply. | 15,000 and 10,000 ohms. |
| Potential supply to each branch of rectifier 169 in series with second auxiliary valve 155. | 110 volts. |
| Resistors 185 and 187 in series with branches of rectifier. | 1000 ohms. |
| Current limiting resistor 179 in series with second auxiliary valve. | 1000 ohms. |

Although I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. For use in supplying power from a source of periodically pulsating current to a load, the combination comprising valve means interposed between said source and said load for controlling the flow of current between said source and said load, a first timing means adapted to be coupled to said valve means which when energized after being so coupled to said valve means causes current to flow to said load in the form of a substantial number of discrete pulses separated by intervals of time having a length of the same order of magnitude as said pulses, each pulse enduring for a time interval greater than a period of said source, a second timing means adapted to be coupled to said valve means and provided with a switch and which when energized after being so coupled to said valve means and after closure of said switch causes current to flow to said load in the form of only a single pulse a predetermined interval of time in length for each closure of said switch, and means for at will coupling one or the other of said timing means to said valve means.

2. Apparatus according to claim 1 characterized by coupling means of such character that one of said timing means is disconnected from said valve means when said other timing means is connected thereto.

3. In combination, an electric discharge valve having a plurality of principal electrodes and a control electrode, a normally open circuit for applying a periodically pulsating potential between said principal electrodes, a normally closed circuit for applying a blocking potential between said control electrode and one of said principal electrodes, said closed circuit comprising charge storing means, and means for charging said charge storing means through said control electrode and said one principal electrode, said charge storing means being so connected to said control electrode and said one principal electrode that by reason of being charged, it applies said blocking potential, another normally open circuit for applying a potential to counteract said blocking potential and render said valve conductive, and means for closing said normally open circuits and opening said normally closed circuit.

4. In combination, an electric discharge valve having a plurality of principal electrodes and a control electrode, a normally open circuit for applying a periodically pulsating potential between said principal electrodes, a normally closed circuit for applying a blocking potential between said control electrode and one of said principal electrodes, said closed circuit comprising charge storing means in circuit with said control electrode and said one principal electrode and means for charging said charge storing means through said control electrode and said one principal electrode so that when charged it maintains said control electrode electrically negative relative to said one principal electrode, another normally open circuit for applying a potential of short duration compared to the periods of said pulsating potential to counteract said blocking potential and render said valve conductive, and means for closing said normally open circuits and opening said normally closed circuit.

5. In combination, an electric discharge valve having a plurality of principal electrodes and a control electrode, a normally open circuit for applying a periodically pulsating potential between said principal electrodes, a normally closed circuit for applying a blocking potential between said control electrode and one of said principal electrodes, said closed circuit comprising charge storing means in circuit with said control electrode and said one principal electrode, and means for charging said charge storing means through said control electrode and said one principal electrode so that when charged it maintains said control electrode electrically negative relative to said one principal electrode, another normally open circuit for applying a potential to counteract said blocking potential and render said valve conductive, and means for closing said normally open circuits and opening said normally closed circuit, said normally open circuit means for applying a potential between said principal electrodes being closed before said normally open circuit means for counteracting said blocking potential is closed.

6. In combination, an electric discharge valve of the arc-like type having a control electrode and a plurality of principal electrodes, means for impressing a periodically pulsating potential between said principal electrodes, means for impressing a blocking potential between said control electrode and one of said principal electrodes, means for superimposing on said blocking potential a potential in the form of impulses which intermittently become large enough to counteract said blocking potential, a network for utilizing the discharge current of said valve connected to said principal electrodes, said network having an impedance such that the current flow through said valve would become so small as to render the valve unstable under the action of the intermittently existing blocking potential if it were the only load on said valve, and stabilizing means for said valve comprising an electrical element of suitable impedance in parallel with said utilization network.

7. In combination, an electric discharge valve of the arc-like type having a control electrode and a plurality of principal electrodes, means for impressing a periodically pulsating potential between said principal electrodes, means for impressing a blocking potential between said control electrode and one of said principal electrodes, means for superimposing on said blocking potential a potential in the form of impulses which intermittently become large enough to counteract said blocking potential, a network for utilizing the discharge current of said valve connected to said principal electrodes, said network having an impedance such that the current flow through said valve would become so small as to render the valve unstable under the action of the intermittently existing blocking potential if it were the only load on said valve, and stabilizing means for said valve comprising an electrical element of substantially smaller impedance than said network in parallel with said utilization network.

8. In combination, an electric discharge valve of the arc-like type having a plurality of principal electrodes, means for impressing a periodically pulsating potential between said principal electrodes, a network for utilizing the discharge current of said valve connected to said principal electrodes, said network having an impedance such that the current flow through said valve would become so small as to render the valve unstable if it were the only load on said valve, and stabilizing means for said valve comprising an electrical element of substantially smaller impedance than said network in parallel with said utilization network.

9. For use in supplying power from a source of periodically pulsating current to a load, the combination comprising valve means interposed between said source and load for controlling the flow of current between said source and said load, control means for effecting current flow through said valve means upon the application to said control means of a potential greater than a predetermined critical value, a first means adapted to be coupled to said control means for applying a potential thereto which is above said critical value in each period of the source during each one of a plurality of spaced time intervals, a second means, adapted to be coupled to said control means and provided with a switch, for applying a potential to said control means which is above said critical value in each period of the source during a single interval of time only for each closure of said switch, and means for at will coupling one or the other of said first and second means to said control means.

JOHN W. DAWSON.